US005538805A

United States Patent [19]
Aragon

[11] Patent Number: 5,538,805
[45] Date of Patent: Jul. 23, 1996

[54] BATTERY WITH INTEGRAL RECHARGER

[75] Inventor: Joel Aragon, Everett, Wash.

[73] Assignee: Power Battery Corporation, Bellevue, Wash.

[21] Appl. No.: 251,506

[22] Filed: May 31, 1994

[51] Int. Cl.$^6$ .................................................. H01M 10/46
[52] U.S. Cl. ............................ 429/7; 429/121; 439/501
[58] Field of Search .................. 429/7, 48, 121; 439/501; H01M 10/46

[56] References Cited

U.S. PATENT DOCUMENTS

| 1,665,987 | 6/1926 | Smith . | |
| 2,073,880 | 6/1935 | Robinson . | |
| 3,625,774 | 12/1971 | Rodgers | 429/121 |
| 4,002,397 | 1/1977 | Wang et al. . | |
| 4,622,507 | 11/1986 | Persen | 320/2 |
| 4,717,349 | 1/1988 | Johnson | 439/92 |
| 4,791,347 | 12/1988 | Britton | 429/121 X |

FOREIGN PATENT DOCUMENTS

| 61-168878 | 7/1986 | Japan | H01M 10/46 |
| 2-112170 | 4/1990 | Japan | H01M 10/46 |

OTHER PUBLICATIONS

Underwriters Laboratory Standard No. 1310, Aug. 21, 1992.

Primary Examiner—Stephen Kalafut

[57] ABSTRACT

A battery having an integral recharger is described. The battery has a cell, a casing, terminals, recharging circuitry and a flexible power connector.

3 Claims, 2 Drawing Sheets

BATTERY WITH INTEGRAL RECHARGER

FIELD OF THE INVENTION

This invention relates to rechargeable batteries generally and most particularly to rechargeable batteries with integral recharging means.

DESCRIPTION OF THE PRIOR ART

Rechargeable batteries with integral recharging means are known in the art. See, for example, U.S. Pat. No. 4,622,507. Such batteries are constructed so as to be used as a power supply in the same manner as any other battery, but are capable of being reconfigured so as to accept a recharging power supply (and thus to be recharged), without any additional or specialized apparatus.

Typically, such batteries incorporate AC power blades or plugs which, when the battery is in its recharging mode, are exposed and then inserted into a standard AC power outlet. When the device is not being recharged, the AC power blades are usually tucked away into the body of the battery so as not to interfere with the normal use of the battery as a power source.

The AC power blades and the apparatus for moving them in and out of operable position consumes space in the battery. This space could otherwise be used to accommodate a larger electrical storage cell that could give the recharged battery longer service life. Also, some of this space could be made available to accommodate circuitry which will allow "smart" recharging and the like. For small battery sizes, such as AA or AAA batteries, the blades alone, which must be ⅝ inch long and ½ inch apart, can be so large as to make it very difficult, if not impossible, to accommodate them within the body of the battery. Also, safety considerations require that shock guards be placed around AC power blades. See Underwriter's Laboratory Standard No. 1310, ¶ 5.17, Aug. 21, 1992. The need for these large general components further aggravates the difficulties posed by the small size of certain standard batteries.

It has therefore long been desired to provide a small battery that can be recharged without the use of any additional components or chargers.

SUMMARY OF THE INVENTION

A battery according to the present invention includes a small flexible strip into which has been imbedded electrical conductors. The flexible strip also includes slits through which AC power blades from a standard AC power plug can be inserted. The electrical conductors within the strip extend into the slits and make electrical contact with the blades of an AC power plug that is inserted in the slits. When not in use, the flexible strip can be housed in a storage means located on the battery.

When the battery is to be recharged, the strip is extended from the battery and the blades of an AC power plug are inserted through the slits. This power plug can be from any standard electrical appliance such as a lamp or a clock. The battery and power plug combination is then plugged into an ordinary AC power outlet. This enables the electrical conductors in the thin flexible strip to be connected to the AC power outlet and to provide AC power to a recharging means within the rechargeable battery. It is not necessary that the electrical appliance associated with the plug be turned on while the battery is being charged.

This arrangement makes it possible for users of rechargeable batteries of almost any size to recharge their batteries using only the batteries themselves and ubiquitous AC power plugs.

DETAILED DESCRIPTION OF THE INVENTION

Figure 1:
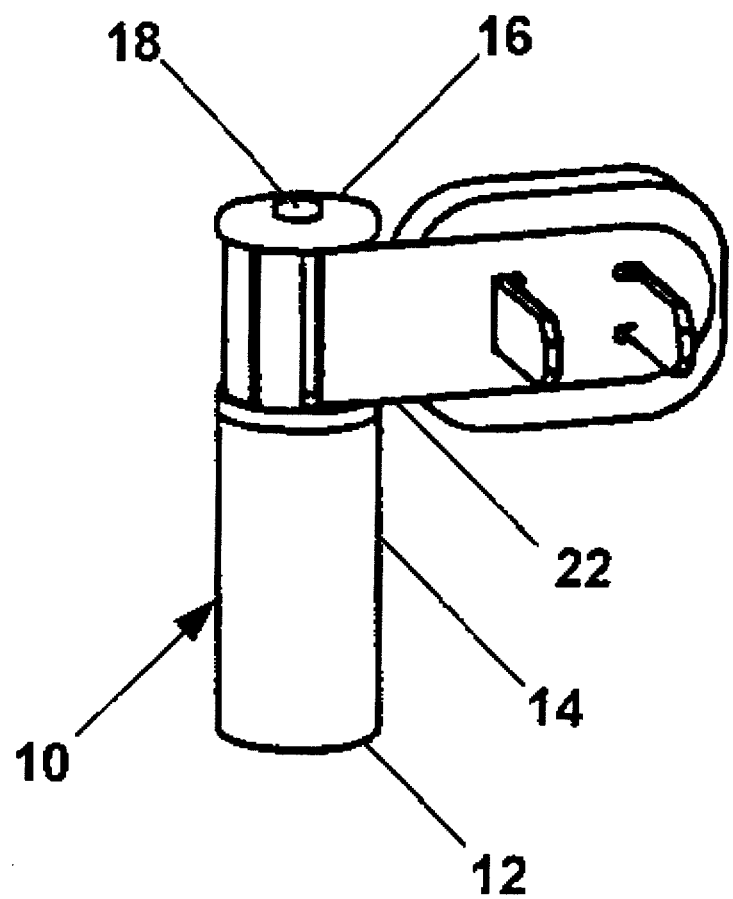
FIGS. 1 and 2 are drawings of a AA Battery constructed in accordance with the present invention, showing an AC power plug inserted into the flexible electrical connector strip.

A battery in accordance with the present invention can be constructed in any general shape configuration that is suited to the intended use of the battery. Thus, standard C, D, AA, and AAA batteries may incorporate the present invention, as may custom designed batteries intended for use in video games, cellular telephones, video cameras, and other devices.

The present invention will now be illustrated with reference to the accompanying drawings of a AA battery which has been constructed in accordance with the present invention.

The battery 10 has an outer casing 12. It is divided into a lower portion 14 in which electrical cell 15 is located and upper portion 16. Cell 15 may be any of a variety of designs, such as nickel cadmium or nickel metal hydride. Upper portion 16 of the casing contains, and serves as a point of attachment for, flexible electrical connector 22. Battery 10 also includes positive terminal 18 and negative terminal 20 located in the usual positions for such terminals. Flexible electrical connector 22 is connected to spool 24 in the upper portion 16 of the battery. The upper portion 16 of the battery also contains recharging circuitry which can be of any design suited to recharge the cell 15. Alternatively, the recharging circuitry can be incorporated in or embedded on flexible connector 22. The flexible electrical connector 22 is attached to spool 24 by means of a retaining tab, not shown.

Slits 26 are provided on the flexible electrical connector to receive the blades of an AC power plug. Throughout this application, the term "blades" is used to refer to the structures which are inserted into a power outlet. These structures appear as blades in a typical 110 volt AC power device used in the U.S., but may appear as posts or other configurations in other standard systems. Slits 26 also include tabs 28 which constrict the openings of slits 26 to ensure that electrical connection is made between the blades of the AC power plug and the electrical conductors (not shown) which are embedded in flexible electrical connector.

Figure 2:
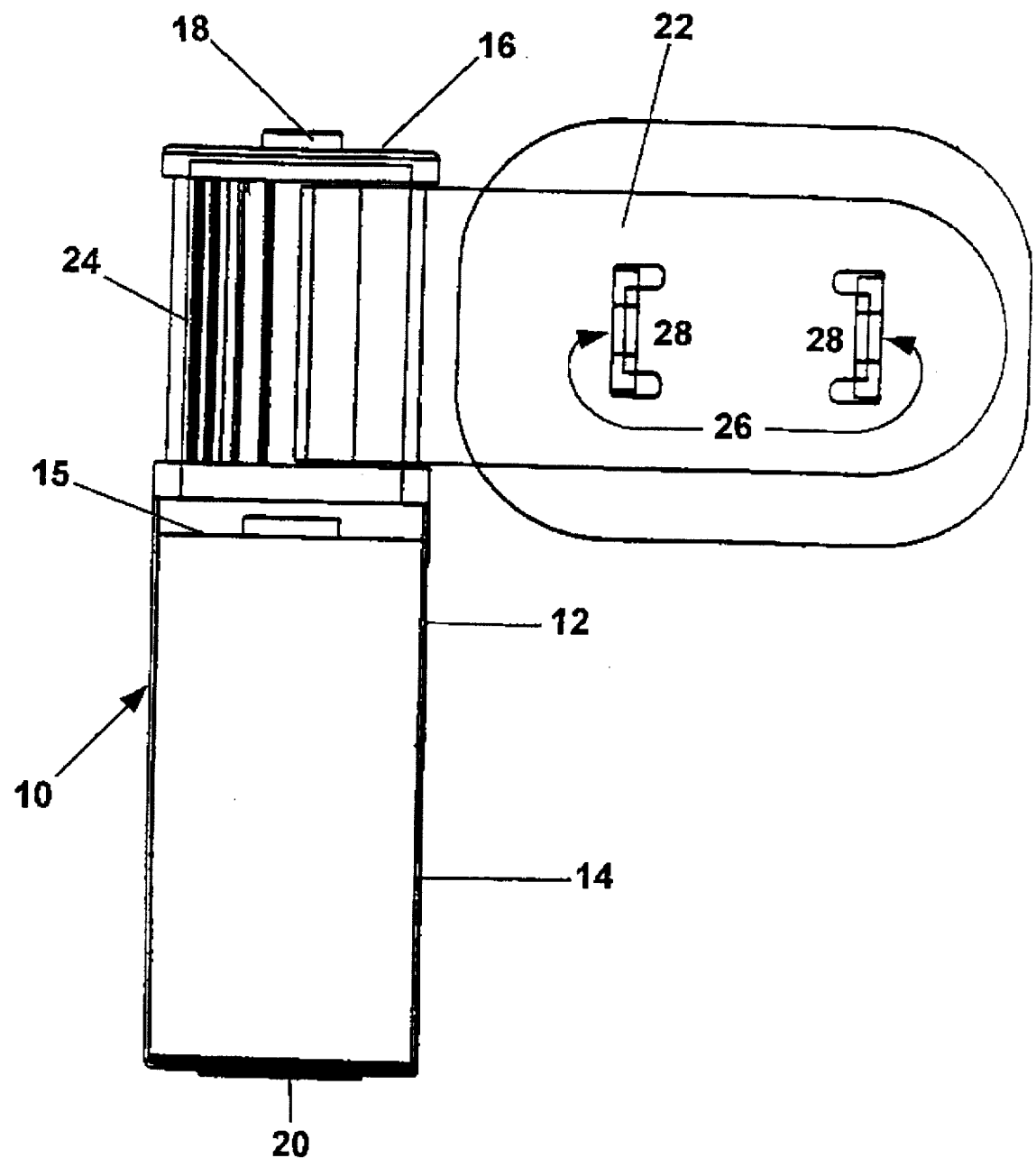

FIG. 2 shows a AA battery constructed according to the present invention with an AC power plug inserted through slits 26. When, in use, an AC power plug is inserted in this manner, the battery and plug combination may be inserted into an AC power outlet.

The flexible electrical connector used in a battery according to the present invention may be made of any readily available, flexible material, such as Teflon or Kapton. The thickness of the flexible electrical connector will depend upon its material properties. Typically, the flexible electrical connector should be from 30 to 60 mils thick, although for very small batteries, a thickness of 15 mils can be acceptable. Since, in many configurations, the flexible electrical connector will support the weight of the battery while it is recharging, it must be thick enough to have sufficient strength to accomplish this. However, it must not be so thick as to compromise the engagement of the AC power blades by the AC power outlet and its ability to be stored when not in use. Electrical connection between the recharging circuitry and the power blades can advantageously be made through electrical conductors, such as light gage metal wires which are embedded in flexible electrical connector 22 or copper laminated and sandwiched in the flexible material.

As will be seen from the foregoing discussion and accompanying drawings, a device according to this invention can be recharged without the need of any external charging apparatus. The only additional materials which are needed, besides the AC power outlet, is an AC power plug, which can be found almost everywhere that AC power outlets are located. It will also be appreciated that the construction of batteries according to the present invention makes it possible to recharge these batteries without displacing any devices which may already be plugged into AC power outlets.

I claim:

1. A battery having an integral recharger, said battery comprising:

a. a casing;

b. a rechargeable cell within the casing;

c. a positive and a negative terminal;

d. a recharging means for recharging the cell; and e. a substantially flat, flexible electrical connection means for providing AC power to the recharging means.

2. The battery of claim 1, wherein the electrical connection means further comprises two openings through which the blades of a standard AC power plug may be inserted, each of said openings comprising an electrical contact means adapted to make electrical contact between the AC power blade inserted through the opening and the flexible electrical connection means.

3. The battery of claim 2 further comprising means for retaining the flexible electrical connection means within the casing when the battery is not being recharged.

* * * * *